(No Model.)

W. T. BROWNE.
AMALGAMATOR.

No. 256,283. Patented Apr. 11, 1882.

Witnesses
Geo. H. Strong.
Frank A. Brooks

Inventor
William T. Browne
By Dewey & Co.
Attys

UNITED STATES PATENT OFFICE.

WILLIAM TRAVIS BROWNE, OF STOCKTON, CALIFORNIA.

AMALGAMATOR.

SPECIFICATION forming part of Letters Patent No. 256,283, dated April 11, 1882.

Application filed August 30, 1881. (No model.)

*To all whom it may concern:*

Be it known that I, WILLIAM TRAVIS BROWNE, of Stockton, county of San Joaquin, and State of California, have invented certain new and useful Improvements in Amalgamators; and I do hereby declare the following to be a full, clear, and exact description thereof.

My invention relates to a novel apparatus for separating precious metals from the gangue with which they may be mixed and amalgamating them; and it consists in the employment of a mercury-containing pan of considerable diameter, having a second pan or distributer so mounted as to rotate concentrically within it. This distributer has a central feed-pipe passing through its bottom, so that the ore or pulp may pass by gravitation between the bottom of the inner pan and the mercury, which rises to a small height above the level of the bottom of the inner pan, and thus produces a certain amount of pressure which the pulp must pass. The rotary motion of the central pan or distributer gradually carries the pulp in spiral lines to the outside, where it rises in the space between the two. A scraper may be fixed to the edge of the inner pan, so as to be carried around in the space between the two and just above the surface of the mercury, and thus move the pulp, which has risen above the surface of the mercury, to the point of discharge at one side of the outer pan.

Figure 1:
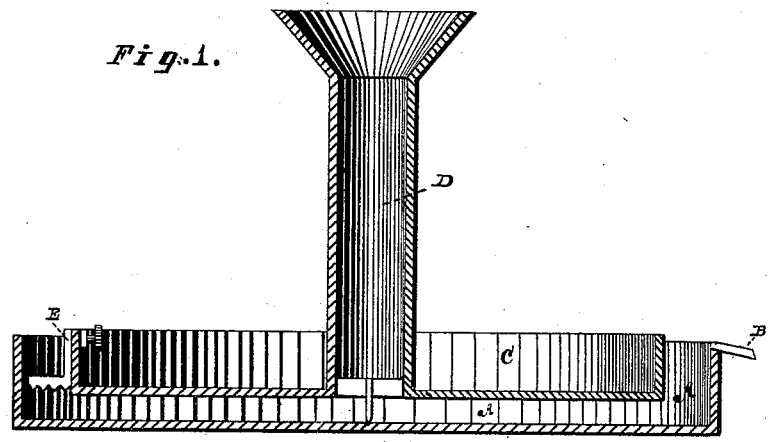
Figure 2:
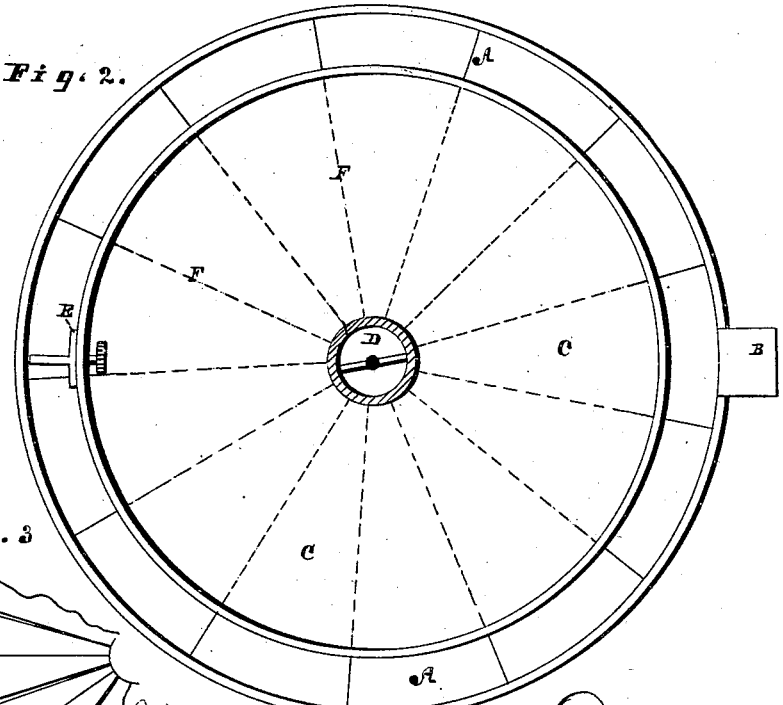
Figure 3:

Referring to the accompanying drawings for a more complete explanation of my invention, Figure 1 is a plan view of my apparatus. Fig. 2 is a vertical section taken through the center. Fig. 3 is a perspective view of the lower pan, A.

A is a pan or vessel of suitable shape and size. This pan is preferably circular and shallow in proportion to its diameter, and it is provided with an outlet or gate at B upon one side of it. Within this pan is a smaller pan or distributer, C, which may have a central pin or pivot, upon which it turns in a suitable step in the bottom of the main or outer pan. From the center of the pan C a feed-pipe, D, arises, its upper end being adapted to receive the pulverized ore or pulp. This pipe passes or opens through the bottom of the inner pan, so as to discharge the pulp below its bottom. The space between the two pans is filled with mercury, which rises a short distance above the bottom on the outside of the inner pan, so as to produce a certain amount of resistance against which the ore or pulp must enter between the bottom of the inner pan and the mercury from the feed-pipe D.

The operation will then be as follows: Ore or pulp is introduced through the pipe D, and when its height is sufficient to overcome the pressure of the mercury in the outer pan it will be carried into the space below the bottom of the inner pan. This bottom I prefer to make flat, and the rotation of the inner pan, which is driven by a belt and pulley or by other suitable device, will distribute the pulp and move it gradually and in curved or spiral lines to the outside of the pan, where it escapes and rises to the surface of the mercury between the sides of the pans.

The principal advantage of my method over the ordinary devices for immersing ore-pulp in mercury is that it is thoroughly distributed by the rotation of the flat-bottomed distributer, and is kept in contact with the surface of mercury beneath the inner pan in a thin sheet and for a long time by this rotation, finally rising to the surface in a constant thin sheet, instead of being projected upward in masses, as in the case where no distributer is employed.

I do not force the ore or pulp into a body of mercury, as this is open to the objection that when so introduced the pressure of the mercury tends to retain the pulp or sand in a mass, which shoots to the surface without any intimate contact with the mercury, except on the outside; and it also has a tendency to entangle and carry off with it some particles of the mercury. By my invention the ore or pulp is simply distributed in a thin sheet upon the surface of the mercury, and every part of it is brought into contact with the mercury under some pressure, so that the precious metals will be amalgamated and retained before the gangue is allowed to escape.

Upon the edge of the inner pan, C, I secure a sort of rake or scraper, E, which may be adjusted to dip into the pulp around the sides between the pans, and this rake assists to carry off the refuse, which, having passed over the mercury, rises to the surface and is no longer of value. The rim of the inner pan is somewhat higher than that of the outer one, and the outer one may also be provided with an outlet, as before described, so that the refuse may be discharged through it as fast as it is brought around by the scraper and motion of the pulp and water between the rims of the pans. The bottom of the outer pan may have shallow depressions or channels F, formed in it, so as to catch and retain the amalgam as it is formed and sinks to the bottom. The rotary motion of the inner pan or distributer, while gradually carrying the sand or pulp to the outside, also keeps it rolling over and over, and by its action may scour and polish any particles of coated or rusty gold, thus rendering their amalgamation more certain.

I am aware that *per se*, first, an inner annular distributer carrying a scraper and a central feed, second, an outer mercury-containing pan, and, third, a pan with an irregular bottom, are old; but the enumerated elements have never before been combined in the manner set forth in the claim, and it is to such combination, therefore, that I confine my claim.

Having thus described my invention, what I claim as new, and desire to secure by Letters Patent, is—

The inner pan or distributer, C, with its central feed-pipe, D, and having the scraper E, in combination with the outer mercury-containing pan, A, within which it is pivoted, so as to be rotated with its bottom immersed in the mercury, said outer pan having its bottom formed with a series of depressions, substantially as and for the purpose herein described.

In witness whereof I hereunto set my hand.

WM. T. BROWNE.

Witnesses:
GEO. H. STRONG,
FRANK A. BROOKS.